United States Patent Office 3,222,099
Patented Dec. 7, 1965

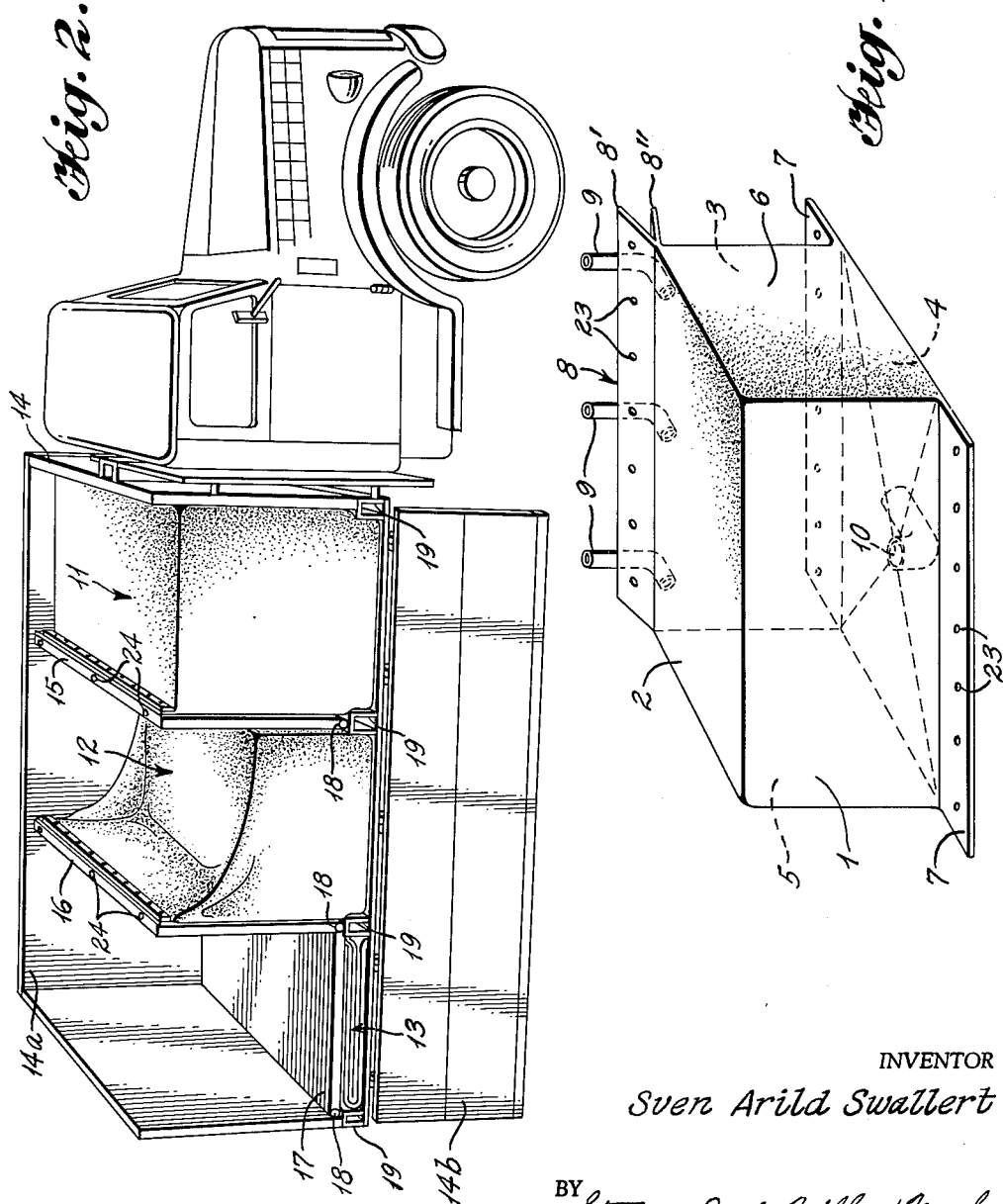

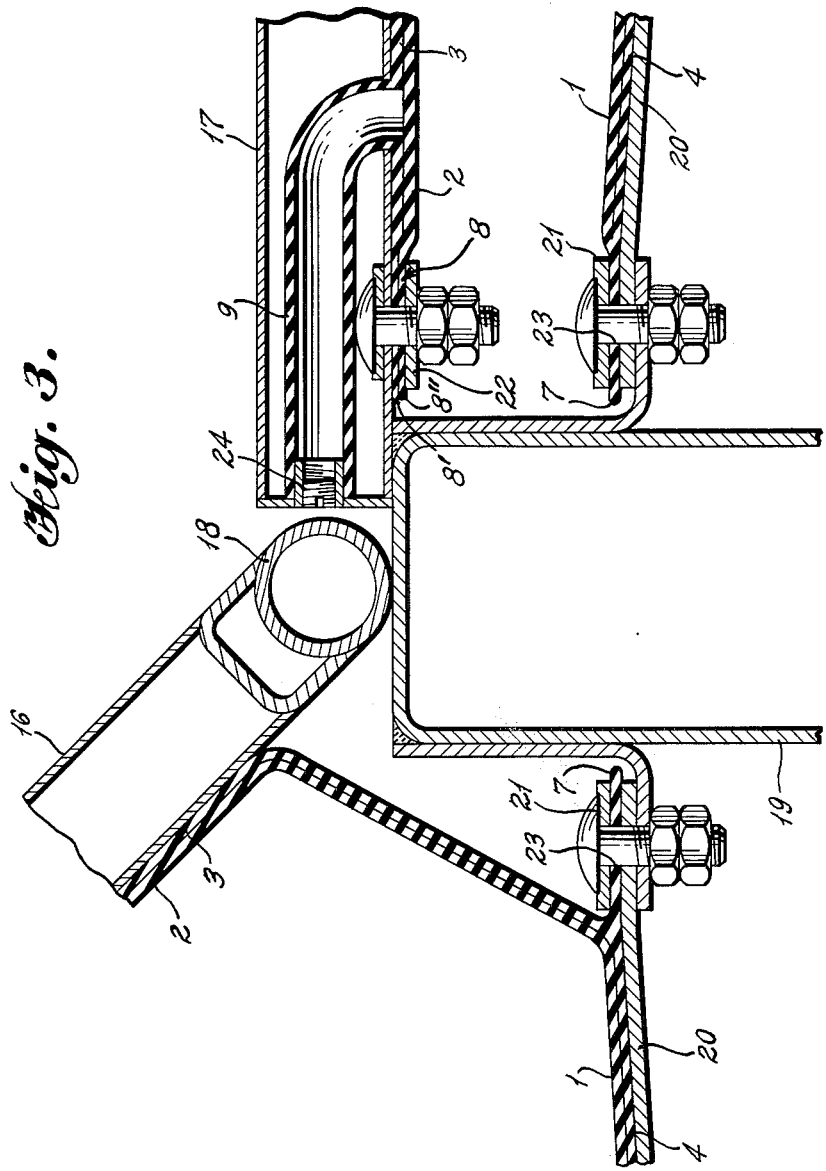

3,222,099
TRANSPORT VEHICLES OR LORRIES PROVIDED WITH A PLATFORM AND FIXED COLLAPSIBLE CONTAINERS FOR FLUID
Sven Arild Swallert, Geneva, Switzerland, assignor to Frode Lund Aktiebolag, Malmo, Sweden, a joint-stock company limited of Sweden
Filed May 12, 1965, Ser. No. 455,189
Claims priority, application Sweden, July 7, 1961, 7,087/61
5 Claims. (Cl. 296—10)

This is a continuation-in-part of my application Serial No. 207,300, of July 3, 1962, now abandoned.

The present invention relates to a transport vehicle comprising a lower platform supported from its chassis and having vertical hinged side flaps disposed around said lower platform, horizontal floor flaps hinged on shafts extending transversely of the vehicle, said floor flaps, constituting an upper platform, substantially parallelepipedal fluid containers of flexible material folded down between said platforms, said hinged floor flaps covering said containers each of said containers having a bottom wall secured to said lower platform and said side flaps and floor flaps in folded-up position supporting the side walls of said containers when filled with fluid.

In lorries of this type e.g. known from the French patent specification No. 1,100,852 the containers are shaped to form bellows and are provided with a steel plate forming the top wall of the container provided with a fluid inlet opening. In the folded down position the container is covered by a floor flap which may be folded upwardly. Before charging a container the floor flap is folded up, after which the steel plate is lifted by hand and attached the hooks on side flaps of the vehicle. Due to the considerable weight of the plate and the height of the side flaps the manoeuvrability of the steel plate is particularly troublesome and labour consuming. Furthermore it may happen that the container upon being folded down is folded in another way than that intended giving rise to damage due to squeezing or pinching of the container.

The object of the invention is to provide a transport vehicle in which the folding of the container takes place safely and automatically and in which the above inconveniences are eliminated.

Another object of the invention is to provide a transport vehicle in which the containers are particularly easy to attach and detach.

A further object is to provide a transport vehicle in which the interior of the containers when the containers are removed from the vehicle is particularly easily accessible for cleaning.

According to the invention the containers have a side wall secured to the underside of the floor flap covering the container, in addition to which the bottom wall of the container is provided with a fluid inlet and outlet pipe communicating with the interior of the container.

Suitably each container is provided with lips projecting along the transversal edge lines of the bottom wall and the side wall secured to the floor flap associated with the container, said lips being secured to said lower platform and said floor flap.

According to a preferred embodiment of the invention at least one of said lips along said transverse edge lines of the container consists of portions of the side walls of the container meeting each other at the edge line and projecting beyond said edge line, the space between said portions forming a passage into the interior of the container, said portions being sealed by compression against each other by means of detachable attachment means securing the lip to the lower platform or the floor flap, respectively, said attachment means extending along the entire length of the lip.

The invention will be more clearly explained in the following description taken in connection with the attached drawing which illustrates an embodiment of the invention shown as an example wherein FIGURE 1 diagrammatically shows a container provided with clamping lips, FIGURE 2 shows a perspective side view of a transport vehicle according to the invention and FIGURE 3 shows in a detail view the mounting of the floor-flap on a cross beam on the lower lorry platform.

As will be evident from FIGURE 1 the container in an entirely expanded state forms a substantial parallelepiped and has a front wall 1, a top wall 2, a rear wall 3 and a bottom wall 4 and two end walls 5 and 6, which are made of reinforced rubber or plastic material. The bottom wall 4 is provided with two transverse lips 7, which serve the purpose of securing the container to the lower lorry platform. The top edge of the rear wall 3 is similarly provided with a lip 8 for securing this wall to the floor flap. The container is provided with three vent and overflow pipes 9 provided with detachable closing members 24, said pipes being let into the floor flap and open in their top edges as viewed in a folded up position. In the lowermost portion of the bottom wall 4 which has a conical shape a fluid inlet and outlet pipe opens out, which pipe is connected to a pump and valve (not shown) in the rear portion of the vehicle.

FIGURE 2 illustrates a container 11 being entirely filled, a container 12 being partially filled and an empty container 13. The front wall 1 of the container 11 abuts against the fixed front flap 14 of the vehicle and the end walls 5 and 6 are intended to abut against the foldable side flaps 14a and 14b, the latter of which 14b being shown in folded down position for the sake of plainness. The floor flap 15 of the container is completely folded up and abuts against supports not shown, which is also the case with the floor flap 16 of the container 12. The top wall 2 and the front wall 1 of the container partly follow the liquid level and due to the vacuum formed in the container above the liquid level during discharging of fluid, a part of the top wall 2 is sucked against the rear wall 3 attached to the upper portion of the floor flap 16 by means of attachment means clamping the lip 8 to the floor flap 16. In the entirely emptied container 13 the top wall 2 and the front wall 1 of the container are in a corresponding way sucked against the rear wall 3, attached to the underside of the floor flap 17, and against the bottom wall 4 attached to the lower platform at the lips 7, and the floor flap 17 is shown in the folded down position.

FIGURE 3 shows the floor flap 16 in partially folded down position and the floor flap 17 in completely folded down position. Each floor flap is mounted for pivoting on a mounting rod 18, which is arranged above a crossbeam 19 on the lower platform 20. The bottom wall 4 of each container is secured to the platform 20 by means of the lips 7, which are clamped between the platform and bars 21 which are provided with mounting bolts passing through holes 23 in the lips 7. The floor flaps are in collapsed position resting with their upper edges on the crossbeams 19, as shown for floor flap 17. The lip 8 of each container is clamped between the floor flap and the bar 22 having bolts passing through holes 23 in the lip 8. The containers shown in FIGURE 3 are entirely emptied, the vent and over flow passages 9 are closed by closing plugs 24 and the walls 1 and 2 are sucked against the walls 3 and 4.

In order to provide for the cleansing of a container it is suitably detachably connected to the vehicle by means of the lips 7 and 8. In this connection at least a lip along one of the edge-lines of the container may be constituted of portions e.g. 8' and 8" of sides of the container meeting each other at the edge line and projecting beyond said edge line, these portions 8' and 8" being sealed by compression against each other by means of the attachment bar adapted for securing the lip to the lowermost platform or the floor flap respectively, which attachment bar extends along the entire length of the lip.

The top wall 2, front wall 1, bottom wall 4 and the rear wall 3 may suitably be made of more thick-walled material than the end walls 5 and 6, and the end walls 5 and 6 provided with folding lines, not shown, in order to facilitate folding of the end walls 5 and 6 automatically inwards into the interior of the container. Alternatively the end walls 5 and 6 may be arranged to form triangular portions as shown in FIGURE 2, which portions are provided with folding lines to facilitate folding of the end walls 5 and 6 automatically inwards between the top wall 5 and the front wall 1 before folding down the associated floor flap.

The pipe 10 opening out in the bottom wall 4 of the container may be provided with an upwardly bent lattice not shown to prevent the top wall 2 or front wall 1 from closing the opening due to suction before the container is completely discharged. In the case the bottom wall 4 has conical shape, however, the lattice is superfluous.

The invention is obviously not limited to the embodiments shown and described but various modifications are possible within the scope of the invention. The transport vehicle according to the invention may for instance be constituted a trailer or a railway-truck.

What is claimed is:

1. A transport vehicle comprising a lower platform supported from its chassis and having vertical hinged side flaps disposed around said lower platform, horizontal floor flaps hinged on shafts extending transversely of the vehicle, said floor flaps constituting an upper platform, substantially parallelepipedal fluid containers of flexible material folded down between said platforms, said hinged floor flaps covering said containers, each of said containers having a bottom wall secured to said lower platform and a fluid inlet and outlet pipe communicating with the interior of the container, said containers having a side wall secured to the underside of the floor flap covering the container, said side flaps and floor flaps in folded-up position supporting the side walls of said containers when filled with fluid.

2. A transport vehicle as claimed in claim 1, wherein each container is provided with lips projecting along the transversal edge lines of the bottom wall and the side wall secured to the floor flap associated with the container, said lips being secured to said lower platform and said floor flap.

3. A transport vehicle as claimed in claim 2, wherein at least one of said lips along said transverse edge lines of the container consists of portions of the side walls of the container meeting each other at the edge line and projecting beyond said edge line, the space between said portions forming a passage into the interior of the container, said portions being sealed by compression against each other by means of detachable attachment means securing the lip to the lower platform or the floor flap, respectively, said attachment means extending along the entire length of the lip.

4. A transport vehicle as claimed in claim 1, wherein the bottom wall of each container has a slightly conical form and said inlet and outlet pipe opens out in the lowermost point of the bottom wall.

5. A transport vehicle as claimed in claim 1, wherein vent and overflow passages communicating with the interior of each container are arranged in the associated floor flaps opening out in its upper edge in a folded-up position and provided with closing means.

References Cited by the Examiner

UNITED STATES PATENTS 773,239 10/1904 Stone _____ 296—10
2,879,785 3/1959 Vesterdal _____ 137—264

FOREIGN PATENTS 948,046 8/1956 Germany.
1,100,852 4/1955 France.

BENJAMIN HERSH, *Primary Examiner.*